(12) United States Patent
Stranberg et al.

(10) Patent No.: US 11,325,304 B2
(45) Date of Patent: May 10, 2022

(54) SYSTEM AND METHOD FOR ADDITIVE MANUFACTURING

(71) Applicant: Continuous Composites Inc., Coeur d'Alene, ID (US)

(72) Inventors: Nathan Andrew Stranberg, Post Falls, ID (US); Dan Budge, Harrison, ID (US); Ryan C. Stockett, Spokane, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 250 days.

(21) Appl. No.: 16/584,068

(22) Filed: Sep. 26, 2019

(65) Prior Publication Data

US 2020/0130260 A1 Apr. 30, 2020

Related U.S. Application Data

(60) Provisional application No. 62/751,461, filed on Oct. 26, 2018.

(51) Int. Cl.
*B29C 64/209* (2017.01)
*B29C 64/118* (2017.01)
(Continued)

(52) U.S. Cl.
CPC ......... *B29C 64/209* (2017.08); *B29C 64/106* (2017.08); *B29C 64/118* (2017.08);
(Continued)

(58) Field of Classification Search
CPC ... B29C 64/209; B29C 64/118; B29C 64/295; B29C 64/393; B29C 64/106; B29C 70/384; B29C 70/54; B33Y 30/00; B33Y 70/00
See application file for complete search history.

(56) References Cited

U.S. PATENT DOCUMENTS 3,286,305 A    11/1966   Seckel
3,453,246 A *   7/1969   Heilman ................. C08F 20/02
                                                                     525/256
(Continued)

FOREIGN PATENT DOCUMENTS

DE      4102257 A1   7/1992
EP       2589481 B1   1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Joseph S Del Sole
*Assistant Examiner* — John Robitaille
(74) *Attorney, Agent, or Firm* — Ryan C. Stockett

(57) ABSTRACT

A method is disclosed for operating an additive manufacturing system. The method may include wetting a reinforcement with a thermoset matrix inside of a print head, discharging the wetted reinforcement from the print head, and moving the print head in multiple directions during discharging. The method may also include exposing the thermoset matrix wetting the reinforcement to a cure energy to initiate a chemical reaction, and directing a medium onto the wetted reinforcement to regulate a rate of the chemical reaction.

19 Claims, 2 Drawing Sheets

(51) Int. Cl.
   *B33Y 70/00* (2020.01)
   *B29C 64/393* (2017.01)
   *B33Y 30/00* (2015.01)
   *B29C 70/38* (2006.01)
   *B29C 70/54* (2006.01)
   *B29C 64/295* (2017.01)
   *B29C 64/106* (2017.01)
   *B29K 101/10* (2006.01)
   *B33Y 10/00* (2015.01)

(52) U.S. Cl.
   CPC .......... *B29C 64/295* (2017.08); *B29C 64/393* (2017.08); *B29C 70/384* (2013.01); *B29C 70/54* (2013.01); *B33Y 30/00* (2014.12); *B33Y 70/00* (2014.12); *B29K 2101/10* (2013.01); *B33Y 10/00* (2014.12)

(56) References Cited

U.S. PATENT DOCUMENTS

| | | |
|---|---|---|
| 3,809,514 A | 5/1974 | Nunez |
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,047,770 A * | 9/1991 | Engeler ................. G11C 29/18 341/120 |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,673,850 B1 * | 1/2004 | Yamato ................. C08L 53/02 522/33 |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0017394 A1 * | 1/2005 | Hochsmann .......... B29C 64/165 264/113 |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0187021 A1 | 8/2007 | Oldani et al. |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0067928 A1 | 3/2016 | Mark et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0015061 A1 * | 1/2017 | Lewicki ................. B33Y 10/00 |
| 2017/0021565 A1 | 1/2017 | Deaville |
| 2017/0028434 A1 | 2/2017 | Evans et al. |

(56) References Cited

U.S. PATENT DOCUMENTS

| | | |
|---|---|---|
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1* | 6/2017 | Kunc ................. B29C 70/222 |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker et al. |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0341300 A1* | 11/2017 | Rudolph ................. B33Y 10/00 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2015018801 A1 | 2/2015 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995). cited by applicant.

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

International Search Report dated Jan. 17, 2020 for PCT/US2019/054052 to Continuous Composites Inc. Filed Oct. 1, 2019.

* cited by examiner

SYSTEM AND METHOD FOR ADDITIVE MANUFACTURING

RELATED APPLICATIONS

This application is based on and claims the benefit of priority from U.S. Provisional Application No. 62/751,461 that was filed on Oct. 26, 2018, the contents of which are expressly incorporated herein by reference.

TECHNICAL FIELD

The present disclosure relates generally to a manufacturing system and, more particularly, to a system for additively manufacturing composite structures and a method of operating the system.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D® provides for increased strength, compared to manufacturing processes that do not utilize continuous fiber reinforcement, improvements can be made to the structure and/or operation of existing systems. For example, there may be times when the matrix cures too quickly after discharge. This can lead to low interlaminar shear strength and/or other undesired characteristics within the resulting structure. The disclosed additive manufacturing system and method are uniquely configured to provide these improvements and/or to address other issues of the prior art.

SUMMARY

In one aspect, the present disclosure is directed to a method of operating an additive manufacturing system. The method may include wetting a reinforcement with a thermoset matrix inside of a print head, discharging the wetted reinforcement from the print head, and moving the print head in multiple directions during discharging. The method may also include exposing the thermoset matrix wetting the reinforcement to a cure energy to initiate a chemical reaction, and directing a medium onto the wetted reinforcement to regulate a rate of the chemical reaction.

In another aspect, the present disclosure is directed to another method for operating an additive manufacturing. This method may include wetting a continuous reinforcement with a thermoset matrix inside of a print head, and discharging the wetted continuous reinforcement from the print head. The method may also include exposing the thermoset matrix wetting the reinforcement to a cure energy from a source mounted to the print head to initiate a chemical reaction, and moving the print head together with a source of the cure energy in multiple directions during discharging. The method may additionally include directing a cooled gas onto the wetted reinforcement after exposure to slow a rate of the chemical reaction.

DETAILED DESCRIPTION

Figure 1:
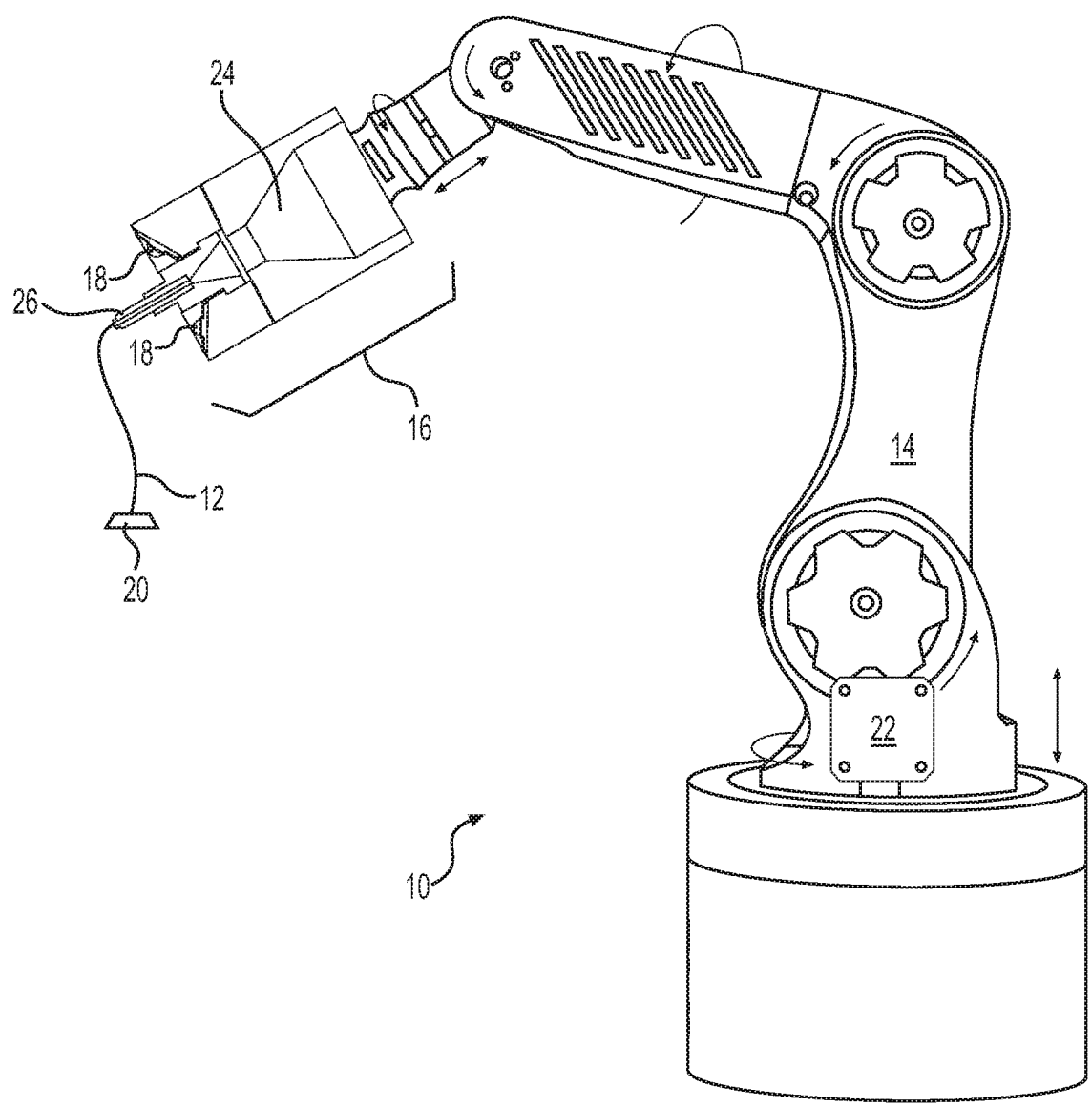
FIG. 1 is an isometric illustration of an exemplary disclosed additive manufacturing system.

FIG. 1 illustrates an exemplary system 10, which may be used to continuously manufacture composite structures 12 having any desired cross-sectional shape (e.g., circular, rectangular, or polygonal). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis (e.g., a trajectory) of structure 12 is three-dimensional. Support 14 may alternatively embody an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or a different manner could also be utilized. In some embodiments, a drive may mechanically couple head 16 to support 14, and include components that cooperate to move portions of and/or supply power to head 16.

Figure 2:
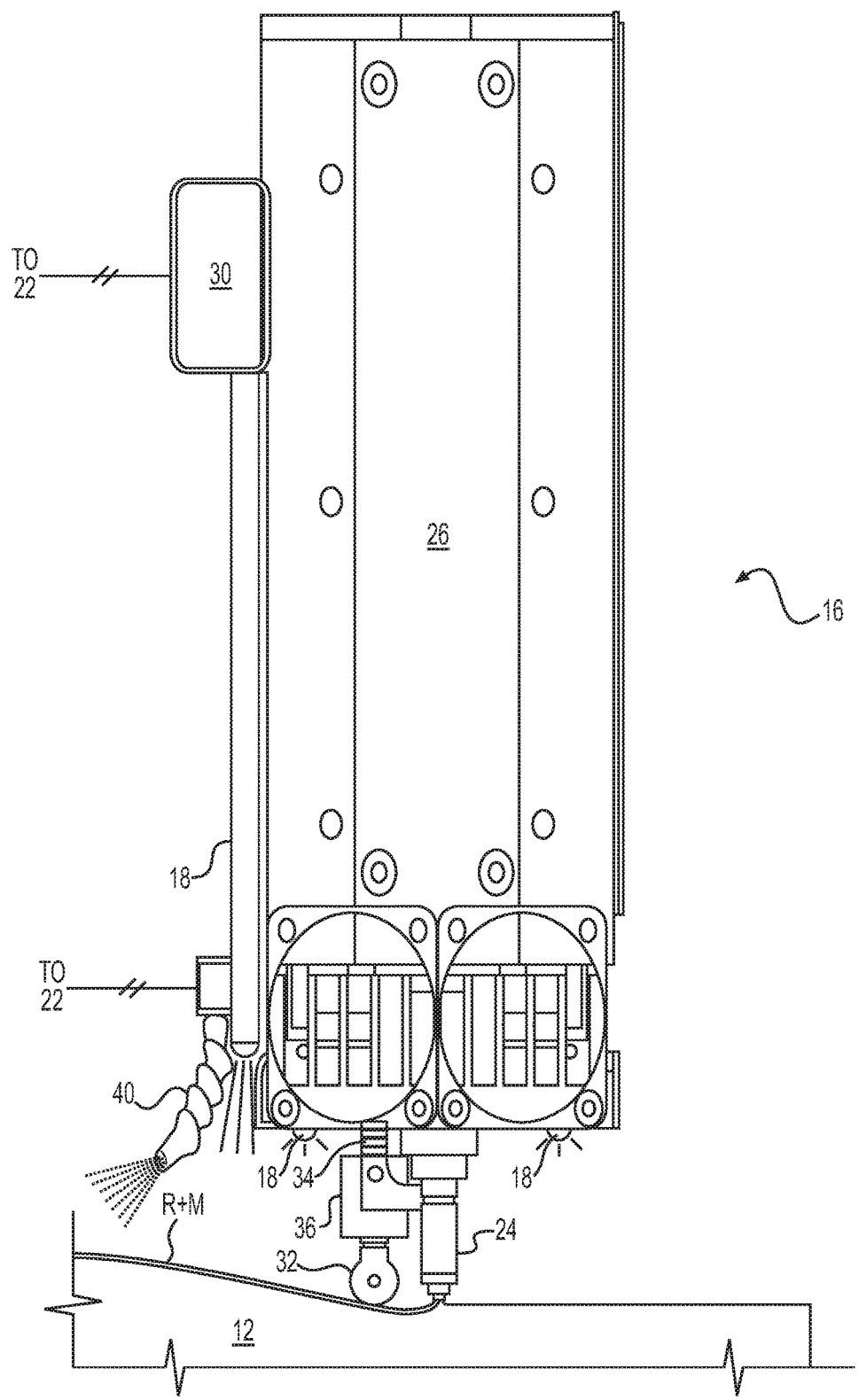
FIG. 2 is a side-view illustration of an exemplary disclosed print head that may be utilized with the additive manufacturing system of FIG. 1.

Head 16 may be configured to receive or otherwise contain a matrix (shown as M in FIG. 2). The matrix may include any type of matrix (e.g., a liquid resin, such as a zero-volatile organic compound resin, a powdered metal, etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiolenes, and more. In one embodiment, the matrix inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16, and pushed or pulled out of head 16 along with one or more continuous reinforcements (shown as R in FIG. 2). In some instances, the matrix inside head 16 may need to be kept cool and/or dark in order to inhibit premature curing or otherwise obtain a desired rate of curing after discharge. In other instances, the matrix may need to be kept warm for similar reasons. In either situation, head 16 may be specially configured (e.g., insulated, temperature-controlled, shielded, etc.) to provide for these needs.

The matrix may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within (e.g., on one or more separate internal spools—not shown) or otherwise passed through head 16 (e.g., fed from one or more external spools—not shown). When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix discharging from head 16.

The reinforcements may be exposed to (e.g., at least partially coated with) the matrix while the reinforcements are inside head 16, while the reinforcements are being passed to head 16, and/or while the reinforcements are discharging from head 16. The matrix, dry reinforcements, and/or reinforcements that are already exposed to the matrix may be transported into head 16 in any manner apparent to one skilled in the art. In some embodiments, a filler material (e.g., chopped fibers) may be mixed with the matrix before and/or after the matrix coats the continuous reinforcements.

One or more cure enhancers (e.g., a UV light, an ultrasonic emitter, a laser, a heater, a catalyst dispenser, etc.) 18 may be mounted proximate (e.g., within, on, or adjacent) head 16 and configured to enhance a cure rate and/or quality of the matrix as it is discharged from head 16. Cure enhancer 18 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, or otherwise cause the matrix to cure as it discharges from head 16. The amount of energy produced by cure enhancer 18 may be sufficient to cure the matrix before structure 12 axially grows more than a predetermined length away from head 16. In one embodiment, structure 12 is completely cured before the axial growth length becomes equal to an external diameter of the matrix-coated reinforcement.

The matrix and/or reinforcement may be discharged from head 16 via at least two different modes of operation. In a first mode of operation, the matrix and/or reinforcement are extruded (e.g., pushed under pressure and/or mechanical force) from head 16 as head 16 is moved by support 14 to create the 3-dimensional trajectory within a longitudinal axis of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, etc.), while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor point 20. In particular, at the start of structure formation, a length of matrix-impregnated reinforcement may be pulled and/or pushed from head 16, deposited onto anchor point 20, and cured such that the discharged material adheres (or is otherwise coupled) to anchor point 20. Thereafter, head 16 may be moved away from anchor point 20, and the relative movement may cause the reinforcement to be pulled from head 16. It should be noted that the movement of reinforcement through head 16 could be assisted (e.g., via internal feed mechanisms), if desired. However, the discharge rate of reinforcement from head 16 may primarily be the result of relative movement between head 16 and anchor point 20, such that tension is created within the reinforcement. It is contemplated that anchor point 20 could be moved away from head 16 instead of or in addition to head 16 being moved away from anchor point 20.

A controller 22 may be provided and communicatively coupled with support 14, head 16, and any number of cure enhancers 18. Each controller 22 may embody a single processor or multiple processors that are configured to control an operation of system 10. Controller 22 may include one or more general or special purpose processors or microprocessors. Controller 22 may further include or be associated with a memory for storing data such as, for example, design limits, performance characteristics, operational instructions, tool paths, and corresponding parameters of each component of system 10. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps may be used by controller 22 to determine the movements of head 16 required to produce the desired size, shape, and/or contour of structure 12, and to regulate operation of cure enhancers 18 in coordination with the movements.

A side view of an exemplary head 16 is disclosed in detail in FIG. 2. As shown in this figure, head 16 may include, among other things, an outlet 24 and a matrix reservoir 26 located upstream of outlet 24. In this example, outlet 24 is a single-channel nozzle configured to discharge composite material having a generally circular, tubular, or rectangular cross-section. The configuration of head 16, however, may allow outlet 24 to be swapped out for another outlet (not shown) that discharges composite material having a different shape (e.g., a flat or sheet-like cross-section, a multi-track cross-section, etc.). Fibers, tubes, and/or other reinforcements may pass through matrix reservoir 26 and be wetted (e.g., at least partially coated and/or fully saturated) with matrix prior to discharge.

As can also be seen in FIG. 2, at least one cure enhancer 18 is located at a trailing side of outlet 24. In this example, cure enhancer 18 includes one or more optical tubes that extend from an energy source (e.g., a U.V. light or laser) 30 to a cure location adjacent outlet 24. In the disclosed embodiment, a compactor 32 is located adjacent outlet 24, and between outlet 24 and cure enhancer 18. It is contemplated, however, that the positions of compactor 32 and cure enhancer 18 may be reversed, if desired. It is also contemplated that more than one compactor 32 may be utilized and organized in an alternating spatial arrangement relative to multiple cure enhancer(s) 18.

Compactor 32 may embody any type of device known in the art for compressing the composite material discharging from outlet 24 and/or for pressing the material against a previously discharged layer of material. In the depicted example, compactor 32 is a roller-type compactor that is biased (e.g., via a spring 34) away from head 16 in an axial direction of outlet 24 and toward the discharging material. It is contemplated, however, that a shoe-type compactor, a skirt-type compactor, or another type of compactor could alternatively or additionally be utilized. Compactor 32 may be location- and/or pressure-adjustable, for example via an actuator (e.g., a hydraulic, pneumatic, and/or electric piston or motor) 36 that is regulated by controller 22 (referring to FIG. 1).

It has been found that, depending on a travel speed of head 16 during material discharge, the matrix in the material discharging from outlet 24 may not fully cure as quickly as desired. In particular, the discharging matrix, while being sufficiently triggered for eventual full cure, may still be somewhat plastic (e.g., even though a thermoset material) for a period of time after discharge. This may be caused, for example, by an increase in temperature during curing within the matrix. If external forces (e.g., tensile forces caused by head 16 moving away from structure 12) of sufficient magnitude were applied to the material during this period of time, it may be possible for the material to be moved away from its discharged location and/or for a contour of the material to be undesirably deformed.

To reduce a likelihood of undesired material movement or deformation, the matrix may be quickly cooled to near or below its plastic temperature. This may be accomplished, for example, via one or more jets 40 located at a trailing side of head 16 (e.g., downstream of cure enhancer 18). In the disclosed example, jet(s) 40 discharge a medium (e.g., a cooled or warmed inert or reactive gas or liquid) toward the material. It should be noted that jet(s) 40, in this example, may not facilitate curing of the matrix, as the matrix is cured via a heat- and/or light-inducing chemical process. Instead, jet(s) 40 may function to cool the curing matrix during a temporary plastic phase. The matrix of this example is not a thermoplastic (e.g., the matrix may be a thermoset) and may not be reheated to induce plasticity.

It is contemplated that jet(s) 40, instead of being used to reduce material movement and/or deformation after discharge, could alternatively be used to selectively stabilize or destabilize curing of the depositing material. For example, one or more of jets 40 of cool, warm, or room-temperature gas could be directed toward outlet 24 to generate a temporary shield around the discharging material. In this instance, the utilized jet(s) 40 may direct temperature-controlled gas toward the discharging material to slow (e.g., inhibit) or speed up (e.g., enhance) the curing, or a catalyzing gas to inhibit or enhance the curing.

In some applications, it may be desirable to slow the curing of deposited material to improve interlaminar sheer strength. That is, a strength between overlapping or adjacent layers may be improved, if the matrix within a first of the layers is not completely cured when a second of the layers is deposited in contact with the first layer. In this way, the two layers may cure together somewhat, allowing for chemical bonds to form therebetween, in addition to mechanical bonds caused solely by hardening of the material. Jet(s) 40 may be used to slow, pause, and/or inhibit the curing of the first layer matrix until after the second layer has been deposited and compacted against the first layer.

In one example, the matrix is a U.V.-initiated matrix, where curing is initiated by exposure to U.V. light. In this example, heat is generated within the matrix due to a chemical reaction, and the heat can speed up the process, even though U.V. light is the primary cure mechanism. For example, for every 10° C. increase in the temperature of the matrix, a rate of curing of the matrix may double. Accordingly, for every 10° C. decrease in the temperature of the matrix caused by cool gas from jet(s) 40, the rate of curing of the matrix may be cut in half.

In another example, the matrix may be U.V.-initiated, but also include a thermo-initiator. In this example, the matrix may first be exposed to U.V. light, triggering a chemical reaction within the matrix that generates heat. Once this heat exceeds a threshold temperature, the thermal initiator may then be triggered, and the chemical reaction may be self-supporting and increase at an exponential rate. This may result in portions of the matrix being cured that have not even been exposed to light. In this example, keeping the temperature of the matrix below or just above (e.g., less than about 110-150% of) the self-supporting threshold temperature may inhibit and/or control a self-supporting or runaway reaction.

In a final example, the matrix may be purely heat-initiated. In this example, the matrix may first be exposed to heat at a particular temperature, triggering a chemical reaction within the matrix that generates even more heat. At this point, the chemical reaction may be self-supporting and increase at an exponential rate. In this example, keeping the temperature of the matrix below or just above the self-supporting threshold temperature may inhibit and/or control a self-supporting or runaway reaction.

Controller 22 may be in communication with jet(s) 40 and configured to regulate operation thereof based on tool paths predetermined for print head 16. For example, controller 22 may be configured to selectively activate, deactivate, and/or meter jet(s) 40 based on an assumed or measured characteristic (e.g., temperature) of the curing matrix and/or based on an assumed or measured temperature, pressure, and/or flow rate of the gas from jet(s) 40. In addition, controller 22 may be configured to determine a time between discharge of the first layer of composite material discussed above and the second and overlapping layer, and selectively regulate jet(s) 40, such that the first layer does not fully cure before the second layer is overlapped and a desired level of cross-linking between layers is achieved. Alternatively, this determination may be made during tool path generation, and thereafter fed to controller 22 as instructions for regulating jet(s) 40. In either situation, controller 22 may coordinate operation of jet(s) 40 with operation of cure enhancer(s) 18, compactor 32, and/or the motion and speed of head 16 that is imparted by support 14.

INDUSTRIAL APPLICABILITY

The disclosed systems may be used to continuously manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, matrix specifications (e.g., cure temperatures), reinforcement specifications, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

To install the reinforcements, individual fibers, tows, and/or ribbons may be passed through matrix reservoir 26 and through outlet 24. In some embodiments, the reinforcements may also need to be connected to a pulling machine (not shown) and/or to a mounting fixture (e.g., to an anchor point 20). Installation of the matrix may include filling head 16 (e.g., reservoir 26) and/or coupling of an extruder (not shown) to head 16.

The component information may then be used to control operation of system 10. For example, the reinforcements may be pulled and/or pushed along with the matrix from head 16. Support 14 may also selectively move head 16 and/or anchor point 20 in a desired manner, such that an axis of the resulting structure 12 follows a desired three-dimensional trajectory. Cure enhancers 18, support motion, jet(s) 40, and/or other operating parameters of system 10 may be adjusted in real time during operation to provide for desired bonding, strength, and other characteristics of structure 12. Once structure 12 has grown to a desired length, structure 12 may be severed from system 10.

It will be apparent to those skilled in the art that various modifications and variations can be made to the disclosed system and methods. Other embodiments will be apparent to those skilled in the art from consideration of the specification and practice of the disclosed system method. It is intended that the specification and examples be considered as exemplary only, with a true scope being indicated by the following claims and their equivalents.

What is claimed is:

1. A method of additively manufacturing a composite structure, comprising:
   wetting a reinforcement with a thermoset matrix inside of a print head;
   discharging the wetted reinforcement from the print head;
   moving the print head in multiple directions during discharging;
   exposing the thermoset matrix wetting the reinforcement to a cure energy after discharge of the thermoset matrix and the reinforcement from the print head to initiate for a first time a chemical reaction within the thermoset matrix; and
   thereafter directing a medium onto the wetted reinforcement to regulate a rate of the chemical reaction.

2. The method of claim 1, wherein directing the medium onto the wetted reinforcement includes directing a cooled gas onto the wetted reinforcement to slow the rate of the chemical reaction.

3. The method of claim 2, wherein directing the medium onto the wetted reinforcement to slow the rate of the chemical reaction includes inhibiting full curing of the thermoset matrix until the wetted reinforcement is overlapped by an additional layer of wetted reinforcement.

4. The method of claim 1, wherein directing the medium onto the wetted reinforcement includes directing an inert gas onto the wetted reinforcement.

5. The method of claim 1, wherein directing the medium onto the wetted reinforcement includes directing a reactive gas onto the wetted reinforcement to increase a rate of the chemical reaction.

6. The method of claim 1, wherein directing the medium onto the wetted reinforcement includes directing a warmed gas onto the wetted reinforcement to increase a rate of the chemical reaction.

7. The method of claim 1, further including adjusting a characteristic of the medium based on a predetermined tool path for the print head.

8. The method of claim 7, wherein adjusting the characteristic includes adjusting a temperature of the medium based on a time required for the wetted reinforcement to be overlapped by an additional layer of wetted reinforcement.

9. The method of claim 1, wherein:
   the chemical reaction becomes self-propagating at a threshold temperature; and
   directing a medium onto the wetted reinforcement after exposure to regulate a rate of the chemical reaction includes maintaining the wetted reinforcement at a temperature that is less than 110% of the threshold temperature.

10. A method of additively manufacturing a composite structure, comprising:
    wetting a reinforcement with a thermoset matrix inside of a print head;
    discharging the wetted reinforcement from the print head;
    moving the print head in multiple directions during discharging;
    exposing the thermoset matrix wetting the reinforcement to a cure energy to initiate a chemical reaction;
    directing a medium onto the wetted reinforcement to regulate a rate of the chemical reaction; and
    compacting the wetted reinforcement prior to exposing the thermoset matrix wetting the reinforcement to the cure energy.

11. The method of claim 1, wherein curing of the thermoset matrix is U.V. initiated.

12. The method of claim 11, wherein the thermoset matrix includes a thermal initiator.

13. The method of claim 1, wherein curing of the thermoset matrix is heat initiated.

14. The method of claim 1, wherein the reinforcement is a continuous reinforcement.

15. The method of claim 1, wherein:
    exposing the thermoset matrix wetting the reinforcement to a cure energy includes exposing the thermoset matrix wetting the reinforcement to a cure energy from a source mounted on the print head; and
    moving the print head in multiple directions during discharging includes moving the source with the print head.

16. A method of additively manufacturing a composite structure, comprising:
    wetting a continuous reinforcement with a thermoset matrix inside of a print head;
    discharging the wetted continuous reinforcement from the print head;
    exposing the thermoset matrix wetting the continuous reinforcement to a cure energy after discharge of the thermoset matrix and the continuous reinforcement from the print head from a source mounted to the print head to initiate for a first time a chemical reaction within the thermoset matrix;
    moving the print head together with a source of the cure energy in multiple directions during discharging; and directing a cooled gas onto the wetted reinforcement after discharge and exposure to slow a rate of the chemical reaction.

17. The method of claim 16, wherein directing the cooled gas onto the wetted continuous reinforcement to slow the rate of the chemical reaction includes inhibiting full curing of the thermoset matrix until the wetted continuous reinforcement is overlapped by an additional layer of wetted reinforcement.

18. The method of claim 16, further including adjusting a temperature of the cooled gas based on a time required for the wetted continuous reinforcement to be overlapped by an additional layer of wetted continuous reinforcement.

19. The method of claim 16, wherein:
   the chemical reaction becomes self-propagating at a threshold temperature; and
   directing a cooled gas onto the wetted continuous reinforcement includes maintaining the wetted continuous reinforcement at a temperature that is less than 110% of the threshold temperature.

\* \* \* \* \*